United States Patent [19]

Lourette et al.

[11] Patent Number: 4,903,055
[45] Date of Patent: Feb. 20, 1990

[54] METHOD AND APPARATUS FOR CALIBRATING AND/OR TESTING A PHOTOGRAPHIC CAMERA

[75] Inventors: Richard W. Lourette; J. David Cocca, both of Rochester, N.Y.

[73] Assignee: Eastman Kodak Company, Rochester, N.Y.

[21] Appl. No.: 303,614

[22] Filed: Jan. 30, 1989

[51] Int. Cl.$^4$ .............................................. G03B 7/24
[52] U.S. Cl. ...................................... 354/21; 354/354
[58] Field of Search ................ 354/21, 75, 289.1, 354, 354/476, 477

[56] References Cited

U.S. PATENT DOCUMENTS

| | | | |
|---|---|---|---|
| 4,012,750 | 3/1977 | Rentschler | 354/232 |
| 4,096,493 | 6/1978 | Sunouchi et al. | 354/38 |
| 4,176,927 | 12/1979 | Wagensonner | 354/21 |
| 4,423,934 | 1/1984 | Lambeth et al. | 354/412 |
| 4,561,741 | 12/1985 | Ishizaka et al. | 354/21 |
| 4,579,432 | 4/1986 | Kobayashi | 354/21 |
| 4,650,304 | 3/1987 | Harvey | 354/21 |
| 4,660,949 | 4/1987 | Saito et al. | 354/21 |

Primary Examiner—L. T. Hix
Assistant Examiner—Brian W. Brown
Attorney, Agent, or Firm—James A. Smith

[57] ABSTRACT

A photographic apparatus for facilitating the calibrating and/or testing of a taking lens of a photographic camera comprises a photographic camera having a film chamber adapted to receive a conventional film cartridge having a code pattern on its surface. The camera includes a microprocessor provided with a first mode of operation for completing a picture taking cycle and a second mode of operation for facilitating the calibration and/or testing of the taking lens. The film chamber is provided with a plurality of electrical contacts for sensing the code pattern on the film cartridge. The photographic apparatus further includes a cartridge facsimile similar in shape and size to the conventional film cartridge. The cartridge facsimile has a diode attached thereto such that when the cartridge facsimile is inserted into the film chamber the diode will make contact between two of the electrical contacts. The microprocessor is programmed such that when it senses the presence of the diode, the microprocessor will be rendered operative in its second mode of operation, whereby a shutter opening blade is unlatched in response to a signal from the microprocessor to uncover the lens allowing an operator to calibrate the lens.

7 Claims, 4 Drawing Sheets

FIG. I
(PRIOR ART)

METHOD AND APPARATUS FOR CALIBRATING AND/OR TESTING A PHOTOGRAPHIC CAMERA

CROSS-REFERENCE TO RELATED APPLICATIONS

Reference is made to U.S. Pat. No. 4,660,949, entitled AUTOMATIC FILM SENSITIVITY SETTING DEVICE FOR CAMERAS, and granted Apr. 28, 1987 in the name of Tokeo Saito et al., and assigned to Seiko Koki Kabushiki Kaisha.

FIELD OF THE INVENTION

The present invention relates to a photographic apparatus for calibrating and/or testing a photographic camera.

BACKGROUND OF THE INVENTION

An operation generally performed during the manufacture of a photographic camera 1 is the focusing of a taking lens 2 with respect to a film plane within the camera. A focus fixture set-up as shown in FIG. 1 generally includes a target 3 comprising light 4 and dark 5 bands, a light source 6 for illuminating the target 3 and a detector 7 at the film plane. The target 3 is rotated at a specific velocity and the detector 7 measures the contrast between the light 4 and dark 5 bands. This is generally known as measuring the Modulation Transfer Function (MTF) response of the lens. The taking lens 2 of the camera 1 will be moved along its optical axis until a predetermined contrast has been measured by the detector 7 at the film plane, thus the taking lens 2 will be correctly calibrated.

It can be seen from the description of the focus fixture above that a shutter mechanism of a camera should remain open for the duration of the calibration of the taking lens.

SUMMARY OF THE INVENTION

The present invention is directed to a photographic apparatus and method for calibrating and/or testing a taking lens. The photographic apparatus uses few parts and the method is easy to perform and reliable.

In accordance with a preferred embodiment of the invention a photographic apparatus includes a camera adapted to receive an encoded film cartridge. The camera includes control means for controlling the operation of the camera. The control means has a first mode of operation for recording an image on light sensitive film and a second mode of operation for facilitating calibration and/or testing of the camera. Circuit means having predetermined electrical characteristics are adapted to be inserted into the camera in place of the encoded film cartridge. Sensing means are provided for sensing the encoded surface of the cartridge and for sensing the predetermined electrical characteristics of the circuit means. Also provided are means responsive to sensing of the encoded surface of the cartridge by the sensing means for rendering the control means operative in the first mode, and responsive to sensing of the electrical characteristics by the sensing means for rendering the control means operative in the second mode.

BRIEF DESCRIPTION OF THE DRAWINGS

Other advantages of the invention will become apparent from the following description taken in connection with the accompanying drawings wherein.

DESCRIPTION OF THE PREFERRED EMBODIMENT

The invention is disclosed as being embodied preferably in an automatic compact 35 mm camera. Because such a camera is well known, this description is directed in particular to photographic elements forming part of or cooperating directly with the disclosed embodiemnt. It is to be understood, however, that other elements not specifically shown or described may take various forms known to persons of ordinary skill in the art.

Figure 2:
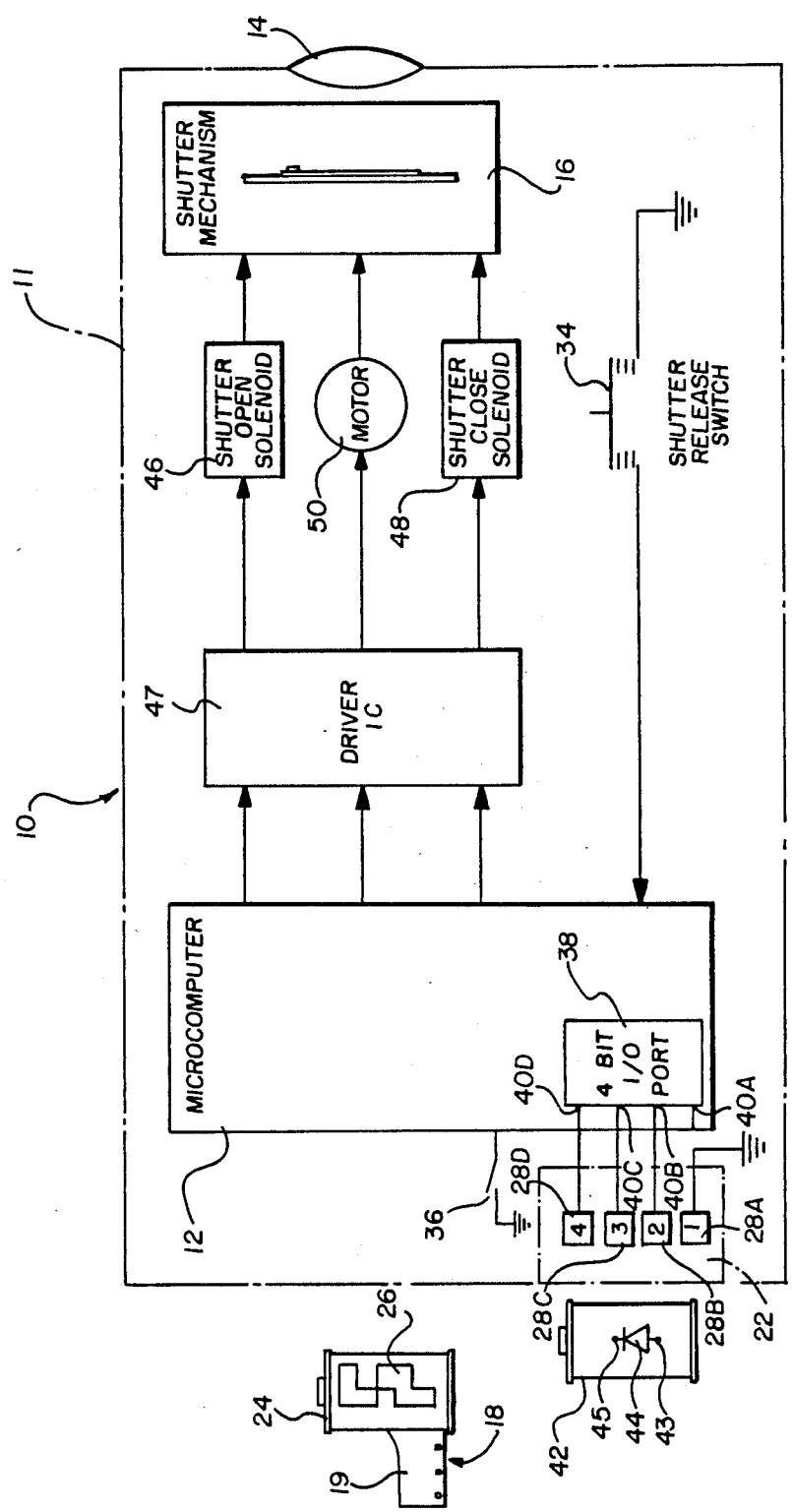
FIG. 2 is a schematic diagram of a portion of the photographic camera.

A photographic apparatus according to a preferred embodiment of the present invention is generally indicated by numeral 10 shown in FIG. 2. The photographic apparatus 10 includes a photographic camera 11 having a control means 12 for controlling the operation of the camera 11, a conventional taking lens 14 for projecting an image onto light sensitive film 18, and a conventional shutter mechanism 16 for allowing light to pass through the lens 14 onto the film 18.

The camera 11 further includes a chamber 22 adapted to receive a conventional film cartridge 24 wherein the film 18 having a normally protruding film leader 19 is normally stored in a light - tight environment. The surface of the film cartridge 24 is provided with a code pattern 26 comprised of particular combinations of conductive and non-conductive areas which correspond to an ISO (International Standards Organization) film speed. Such a code pattern is conventional on a DX type cartridge to identify the ISO speed of the film 18 accommodated in the cartridge 24. Various combinations of the conductive and non-conductive areas corresponding to the film speed of the film 18 accommodated in the film cartridge 24 are disclosed in FIG. 3 in the U.S. Pat. No. 4,660,949 granted Apr. 28, 1987 to Saito et al. the disclosure of which is hereby incorporated by reference.

The cartridge receiving chamber 22 is provided with a plurality of electrical contacts 28A,28B,28C,28D positioned such that the electrical contacts 28A,28B,28C,28D correspond to the code pattern 26 on the cartridge 24 and sense a particular combination of the conductive and non-conductive areas to set the film speed automatically in the camera 11. The film speed data is sensed by the control means 12 through the electrical contacts 28B,28C,28D, contact 28A being connected to ground, as a binary code. For example, the binary code for ISO 100 sensed by the control means 12 would be "101", "1" corresponding to a high signal and "0" corresponding to a low signal. An example of an apparatus for sensing the code pattern on a film cartridge is disclosed in U.S. Pat. No. 4,660,949 by Saito et al. Such an apparatus can be suitable for use in automatic 35 mm cameras, for example a Kodak VR35 Model K12 camera or equivalent.

The control means 12 includes a known programmable microprocessor such as a MSM 6402 GS-V1K microprocessor commercially available from Oki Semiconductor, Inc. having a four bit input/output (I/O) port 38 wherein the microprocessor 12 can configure each port 40A,40B,40C,40D selectively as inputs or outputs. The I/O ports 40B,40C,40D are electrically connected to electrical contacts 28B,28C,28D respectively, contact 28A being connected to ground. Means responsive to sensing of the code pattern 26 by the electrical contacts 28B,28C,28D are provided in the microprocessor 12 for rendering the microprocessor 12 operative in a first mode of operation wherein the microprocessor 12 controls the exposure time based in part on the ISO film speed.

A film-presence switch 36 is located near the cartridge receiving chamber 22 and connected to the control means 12. When a film cartridge 24 is loaded into the chamber 22 of the camera 11 the film -presence switch 36 will be closed by the normally protruding film leader 19 and remain closed until the film 18 is wound into the cartridge 24.

Upon manually closing a trigger button (not shown) normally located on the top surface of the camera 11 a shutter release switch 34 connected to the microprocessor 12 will close and a complete picture taking cycle will begin.

A preferred embodiment of the present invention includes a cartridge facsimile 42 similar in size and shape to the conventional cartridge 24. The cartridge facsimile 42 is provided with a circuit means 44 including a general purpose silicon diode having predetermined electrical characteristics positioned on the surface of the cartridge facsimile 42 in the same general area as the position of the code pattern 26 on the conventional cartridge 24. When the cartridge facsimile 42 is loaded into the cartridge receiving chamber 22 of the camera 11 one end 43 of the diode 44 will be electrically connected to contact 28B and the other end 45 will be electrically connected to contact 28C in a forward bias arrangement. Upon insertion of the cartridge facsimile 42 into the cartridge receiving chamber 22 the microprocessor 12 will perform a plurality of tests, to be described below, wherein the microprocessor 12 will detect the presence of the diode 44 and will automatically assume a second mode of operation.

It can be seen that the circuit means 44 can comprise any combination of electrical components. For example conventional resistors and capacitors can be combined in an electrical circuit arrangement such that the circuit will provide a unique signal which is different from the ISO film speed value and render the microprocessor 12 operative in the second mode of operation.

In its second mode of operation the microprocessor 12 will send a signal through a conventional drive integrated circuit (IC) 47 to de-energize a shutter open solenoid 46 to unlatch a spring driven opening blade (not shown) associated with the shutter mechanism 16 to uncover the lens 14 so that an operator (not shown) can calibrate and/or test the lens 14. When the cartridge facsimile 42 is removed from the cartridge receiving chamber 22 the diode 44 will no longer be detected by the microprocessor 12 and the microprocessor 12 will send a second signal to de-energize a shutter close solenoid 48 to unlatch a spring driven shutter closing blade (not shown) to cover the lens 14. Then a conventional film advance and shutter resetting motor 50 will be energized to reset the shutter mechanism 16 to its initial position.

Figure 3A:
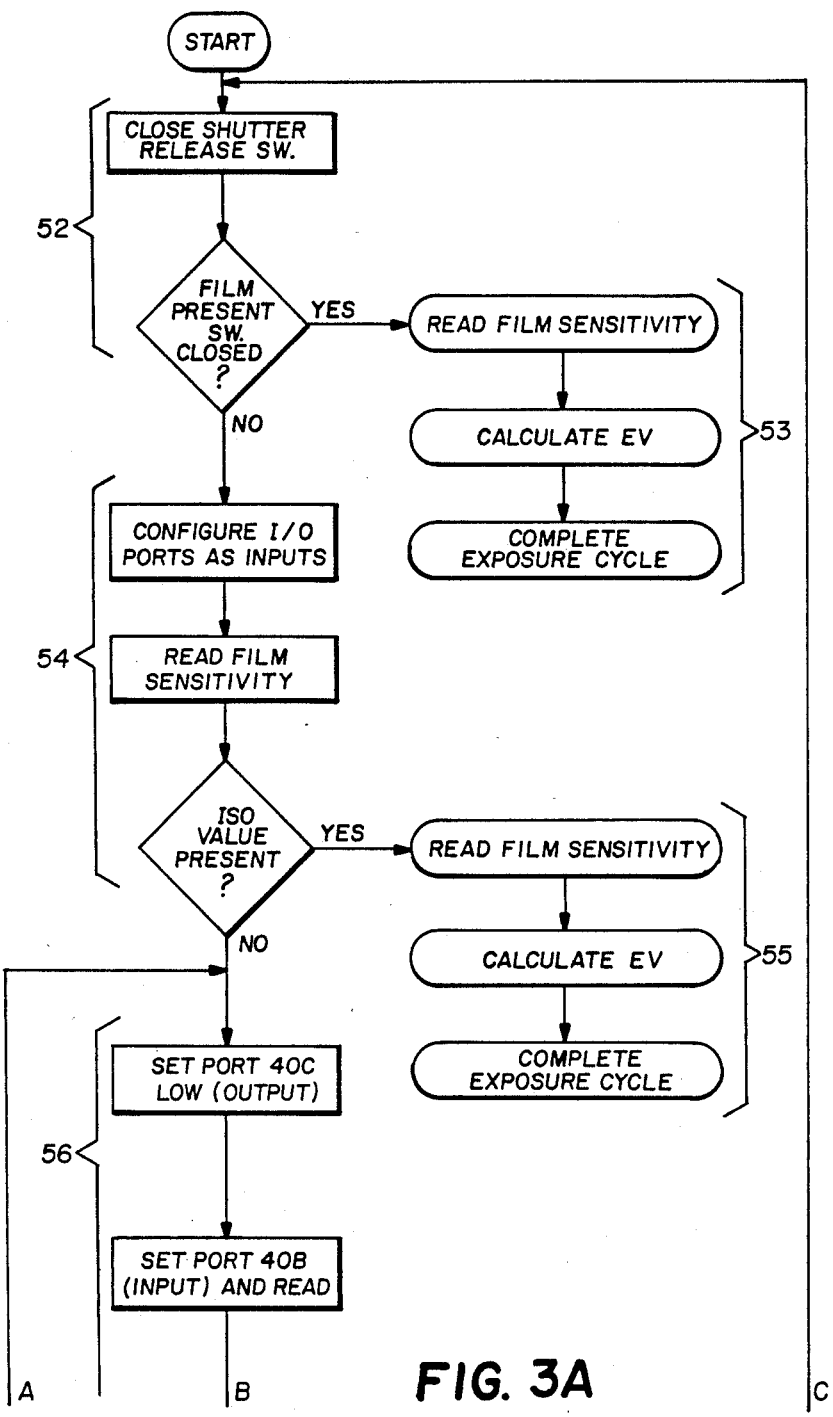
FIGS. 3A and 3B are a flow chart of a subroutine for detecting the presence of a diode in a photographic camera.
Figure 3B:
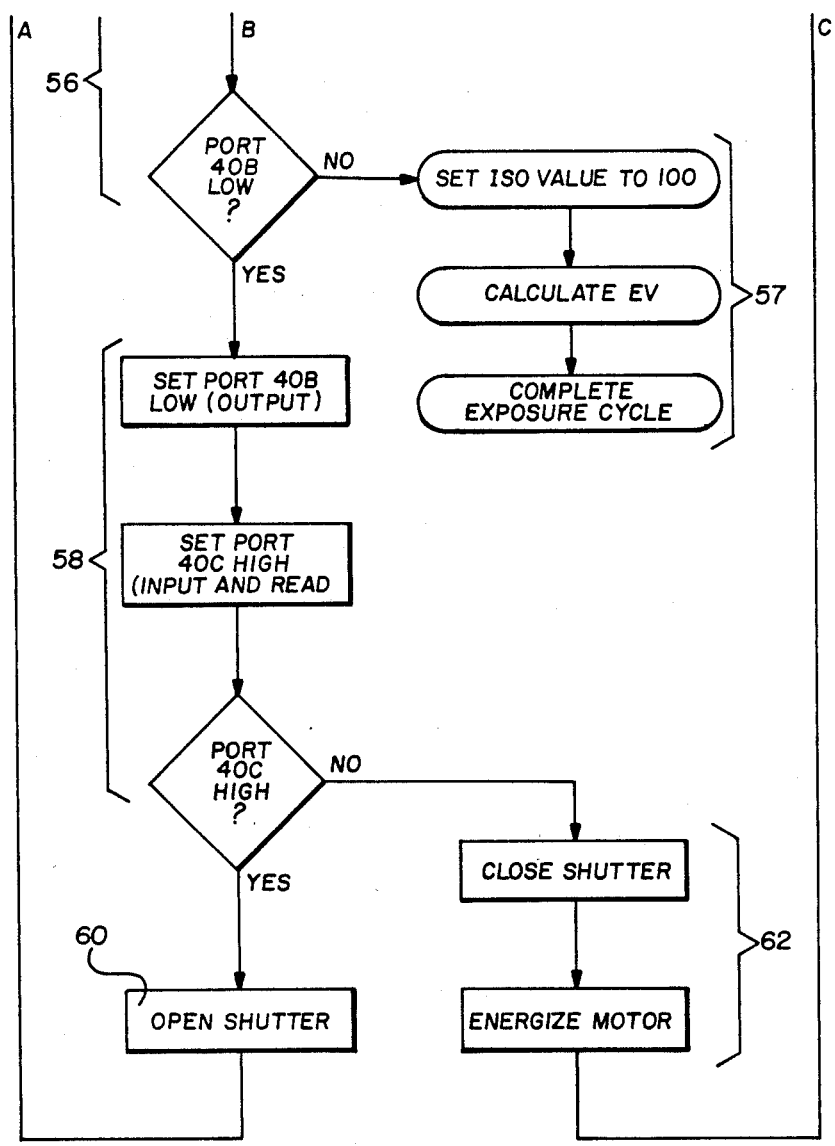

The operation of the photographic apparatus 10 will be described referring to FIG. 2 and FIGS. 3A and 3B which show a flowchart indicating the steps the microprocessor performs to detect the presence of the circuit means 44.

The camera 11 is initialized such that the shutter blades associated with the shutter mechanism 16 are covering the lens 14 and the film -presence switch 36 and the shutter release switch 34 are in their open positions. Generally on an assembly line there are no film cartridges 24 loaded into the camera 11.

Figure 1:
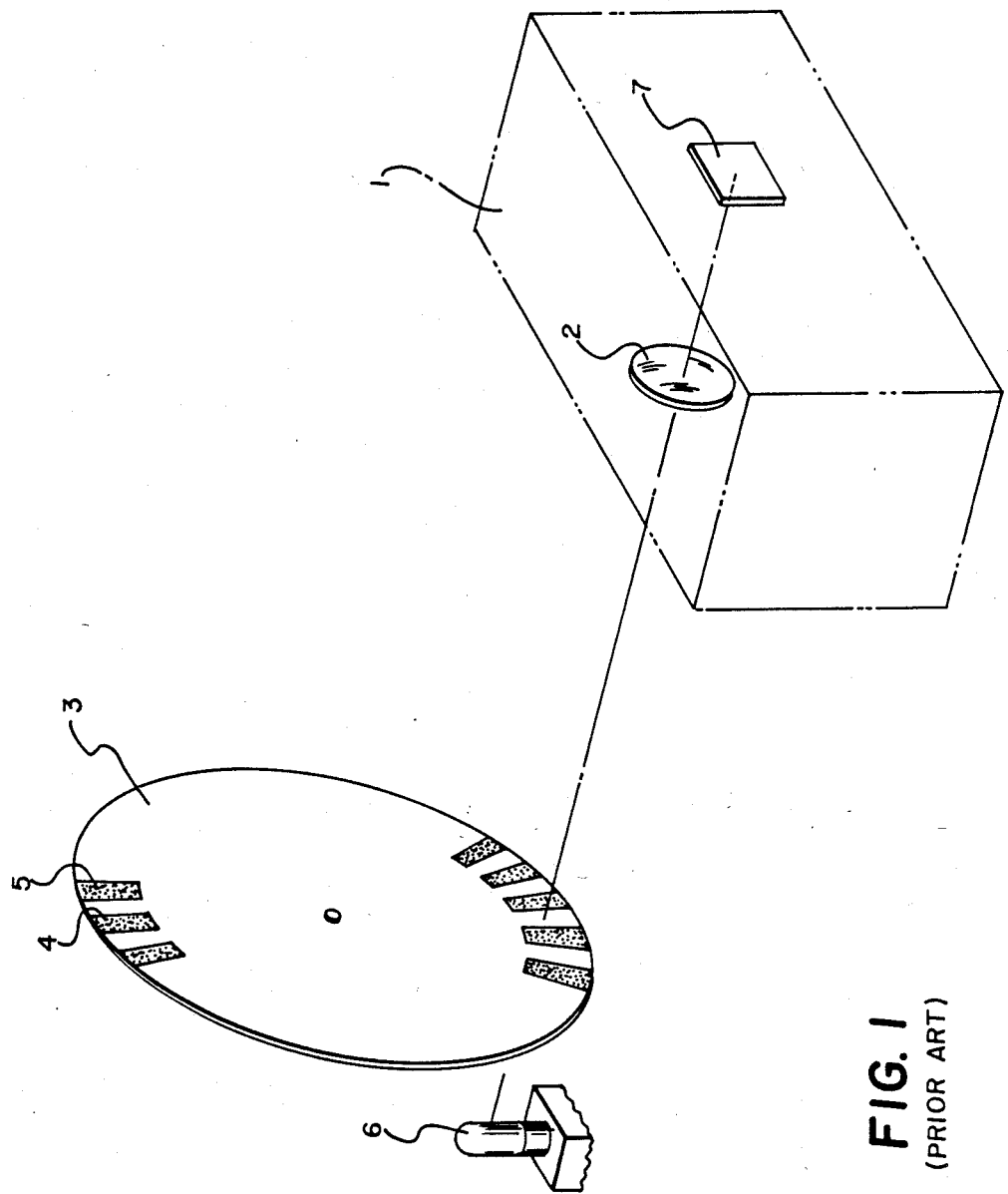
FIG. 1 is a perspective view of a portion of a focus fixture and a camera embodying the present invention.

To begin the operation of calibrating the lens 14 of the camera 11 an operator (not shown) loads a cartridge facsimile 42 into the cartridge receiving chamber 22 and positions the camera 11 on a focus fixture similar to that disclosed in FIG. 1. The operator then presses the trigger button which closes the shutter release switch 34 as indicated at steps 52. Since there is no film 18 in the cartridge facsimile 42 the film -presence switch 36 will remain open and the microprocessor 12 will proceed to steps 54.

If a conventional cartridge 24 having film 18 was inadvertently loaded into the cartridge receiving chamber 22 of the camera 11 the film-presence switch 36 will close due to the presence of the film leader 19 and the microprocessor 12 will proceed to steps 53 where it will attempt to read the film speed indicated by the code pattern 26 located on the surface of the cartridge 24. The microprocessor 12 will remain in its first mode of operation and complete a picture-taking cycle based in part on the film speed.

At steps 54 with the cartridge facsimile 42 loaded into the camera 11 and the film -presence switch 36 not closed the microprocessor 12 will configure the I/O ports 40B,40C,40D as inputs such that the microprocessor 12 will attempt to read a film speed value through the I/O ports 40B,40C,40D connected to the electrical contacts 28B,28C,28D. If any combination of ports provides a low ("L") signal to the microprocessor 12 a film speed is read, which can means that a conventional film cartridge has unintentionally been inserted into the cartridge receiving chamber 22 and steps 55 will be performed. At this point it has been determined that the film -presence switch 36 is not closed; this can mean that the film 18 is wound into the cartridge 24. The microprocessor will complete a picture-taking cycle based in part on the film speed.

If the microprocessor 12 reads a high ("H") signal at all the ports 40B,40C,40D either the diode 44 is present or a conventional film cartridge with no code pattern located on the surface of the cartridge is loaded into the cartridge receiving chamber 22 of the camera 11. The microprocessor 12 will then proceed to steps 56 where the microprocessor 12 will set port 40C "L" configuring it as an output port and will set port 40B "H" configuring it as an input port for providing a signal to the microprocessor 12. The port 40B will then provide a "L" signal due to the forward bias characteristics of a diode indicating the presence of the diode 44 in the correct orientation. The microprocessor 12 will proceed next to steps 58.

If on the other hand the microprocessor 12 continues to read a "H" signal at port 40C indicating no current is flowing between contacts 28B and 28C hence no diode 44 is present or is incorrectly oriented or a conventional film cartridge with no code pattern located on its surface is present in the cartridge receiving chamber 22. The microprocessor 12 will complete steps 57. It has been determined to this point that the cartridge loaded in the cartridge receiving chamber 22 does not have a code pattern located on its surface. In the absence of a coded ISO film speed value the microprocessor 12 will provide a predetermined ISO value, for example ISO 100, as disclosed in U.S. Pat. No. 4,660,949 and a picture-taking cycle based in part on the ISO 100 value will be completed.

At steps 58 the microprocessor 12 will set port 40B "L" configuring it as an output and set port 40C "H" reading it as an input such that the reverse bias characteristic of the diode 44 will be checked. The microcomputer 12 will continue to read a "H" signal at port 40C due to the inability of current to flow between contacts 28C and 28B if the diode 44 is present.

Steps 56 and 58 are necessary parts of this method of calibrating the lens 14 in order to positively identify the diode 44 as opposed to an electrical short between any of the electrical contacts or an inverted diode connected between the electrical contacts.

At this point the microprocessor 12 has passed steps 52,54,56,58 and will proceed to step 60 where it will signal the driver IC 47 to de-energize the shutter open solenoid 46 to unlatch the spring driven shutter opening blade to uncover the lens 14. The operator will then move the taking lens 14 until the predetermined contrast between the light and dark bands of the target shown in FIG. 1 and described above has been achieved, thus calibrating the lens 14. During the calibration of the lens the microprocessor 12 will repeat steps 56 and 58 so that the lens 14 will remain uncovered. Upon completion of the calibration of the lens 14 the operator will remove the cartridge facsimile 42 from the cartridge receiving chamber 22 thus breaking the electrical contact between the diode 44 and contacts 28B,28C. The microprocessor 12 will then signal the driver IC 47 to de-energize the shutter close solenoid 48 to unlatch the spring driven closing blade to cover the lens 14 as indicated in steps 62. The motor 50 will then be energized and the shutter mechanism 16 will be reset to its initial position.

There is thus provided a simple, reliable and cost effective method and apparatus for calibrating and/or testing a taking lens of a camera.

The present invention has been described in detail with particular reference to a preferred embodiment thereof, but it will be understood that variations and modifications can be effected within the spirit and scope of the invention.

I claim:

1. Photographic apparatus comprising:
   a camera adapted to receive a film cartridge having a surface provided with a code pattern;
   control means for controlling the operation of the camera, said control means having a first mode of operation for recording an image on light sensitive film and a second mode of operation for facilitating calibration and/or testing of the camera;
   circuit means having predetermined electrical characteristics adapted to be inserted into the camera in place of said cartridge;
   sensing means for sening said code pattern and for sensing said electrical characteristics; and
   means responsive to sensing of said code pattern by said sensing means for rendering said control means operative in said first mode, and to sensing of said electrical characteristics by said sensing means for rendering said control means operative in said second mode.

2. Photographic apparatus comprising:
   a camera having a chamber adapted to receive a conventional film cartridge having a surface provided with a code pattern;
   a microprocessor for controlling the operation of said camera, said microprocessor having a first mode of operation for recording an image on light sensitive film and a second mode of operation for facilitating calibration and/or testing of the camera;
   a cartridge facsimile similar in size and shape to said film cartridge to be inserted into said camera in place of said film cartridge;
   circuit means having predetermined electrical characteristics attached to said cartridge facsimile;
   sensing means for sensing said code pattern and for sensing said electrical characteristics attached to said cartridge facsimile; and
   means responsive to sensing of said code pattern by said sensing means for rendering said microprocessor operative in said first mode, and to sensing of said electrical characteristics by said sensing means for rendering said microprocessor operative in said second mode.

3. The photographic apparatus as defined in claim 2 wherein said circuit means includes a general purpose diode attached to said cartridge facsimile in the same general area as said code pattern is positioned on said surface of said conventional film cartridge.

4. The photographic apparatus as defined in claim 2 wherein said sensing means includes a plurality of electrical contacts provided in said chamber positioned such that said electrical contacts correspond to said code pattern.

5. The photographic apparatus as defined in claim 2 further comprising:
   a taking lens for projecting an image on light sensitive film;
   a shutter mechanims including an opening blade for uncovering said taking lens and a closing blade for covering said taking lens; and
   means for actuating said shutter mechanism to cause said opening blade to uncover said taking lens when said microprocessor is rendered operative in said second mode of operation to allow calibration of said taking lens.

6. A method for calibrating and/or inspecting a taking lens in a conventional photographic camera having a microprocessor, said method comprising the steps;
   A. providing a cartridge facsimile having an electrical circuit attached thereto;
   B. inserting said cartridge facsimile into the photographic camera in place of a conventional film cartridge;
   C. detecting the presence of said electrical circuit by the microprocessor in the photographic camera;
   D. unlatching a shutter opening blade in response to a signal sent by the microprocessor to uncover the taking lens;
   E. inspecting the taking lens;
   F. moving the taking lens into a calibrated position;
   G. unlatching a shutter closing blade in response to another signal sent by the microprocessor to cover the taking lens;
   H. resetting said shutter blades to their initial positions.

7. A method as defined in claim 6 wherein said electrical circuit includes a general purpose diode.

* * * * *